US012689064B2

(12) United States Patent
Takahashi et al.

(10) Patent No.: US 12,689,064 B2
(45) Date of Patent: Jul. 21, 2026

(54) SECONDARY BATTERY, ELECTRONIC DEVICE, AND POWER TOOL

(71) Applicant: MURATA MANUFACTURING CO., LTD., Kyoto (JP)

(72) Inventors: Masashi Takahashi, Kyoto (JP); Hirotaka Fukudome, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 894 days.

(21) Appl. No.: 17/872,499

(22) Filed: Jul. 25, 2022

(65) Prior Publication Data

US 2022/0367917 A1      Nov. 17, 2022

Related U.S. Application Data

(63) Continuation of application No. PCT/JP2021/002128, filed on Jan. 22, 2021.

(30) Foreign Application Priority Data

Feb. 17, 2020      (JP) ................................. 2020-024003

(51) Int. Cl.
*H01M 10/0585*      (2010.01)
*H01M 50/107*      (2021.01)
*H01M 50/325*      (2021.01)

(52) U.S. Cl.
CPC ..... *H01M 10/0585* (2013.01); *H01M 50/107* (2021.01); *H01M 50/325* (2021.01); *H01M 2220/30* (2013.01)

(58) Field of Classification Search
CPC ........... H01M 10/0587; H01M 50/107; H01M 50/325; H01M 50/538; H01M 50/109;
(Continued)

(56) References Cited

U.S. PATENT DOCUMENTS

2004/0023107 A1*   2/2004   Nakanishi ........... H01M 50/566
                                                        429/211
2011/0217576 A1*   9/2011   Ueda ................. H01M 10/0587
                                                        429/94
(Continued)

FOREIGN PATENT DOCUMENTS

CN          102057521 A      5/2011
JP          2007335156 A      12/2007
(Continued)

OTHER PUBLICATIONS

International Search Report of corresponding PCT application PCT/JP2021/002128, dated Apr. 6, 2021.
(Continued)

*Primary Examiner* — Mark Ruthkosky
(74) *Attorney, Agent, or Firm* — K&L Gates LLP

(57)      ABSTRACT

Disclosed is a secondary battery in which a negative electrode has a covered portion covered with a negative electrode active material covering portion and a negative electrode active material non-covered portion on a strip-shaped negative electrode foil, the negative electrode active material non-covered portion is joined to a negative electrode current collector plate at the other end portion of the electrode winding body, the electrode winding body has a flat surface formed by bending any one or both of a positive electrode active material non-covered portion and the negative electrode active material non-covered portion toward a central axis of the wound structure and overlapping the positive electrode active material non-covered portion and the negative electrode active material non-covered portion, and a first groove formed in the flat surface, at least one C-shaped second groove is included in a can bottom of a battery can.

7 Claims, 12 Drawing Sheets

(58) Field of Classification Search

CPC .. H01M 2220/30; H01M 4/75; H01M 10/045;
H01M 10/0585

See application file for complete search history.

(56) References Cited

U.S. PATENT DOCUMENTS

| | | | |
|---|---|---|---|
| 2015/0132625 A1 | 5/2015 | Miyata et al. | |
| 2018/0175333 A1* | 6/2018 | Sodeyama | ............ B60L 3/0046 |

FOREIGN PATENT DOCUMENTS

| | | |
|---|---|---|
| JP | 2011134663 A | 7/2011 |
| JP | 2015135822 A | 7/2015 |
| WO | 2014045569 A1 | 3/2014 |
| WO | 2017094228 A1 | 6/2017 |

OTHER PUBLICATIONS

Office Action issued for corresponding Chinese Patent Application No. 202180009058.0, dated Oct. 15, 2025. (5 pages.).
Search Report issued for corresponding Chinese Patent Application No. 202180009058.0, dated Oct. 15, 2025. (3 pages.).

* cited by examiner

1

A

B

SECONDARY BATTERY, ELECTRONIC DEVICE, AND POWER TOOL

CROSS REFERENCE TO RELATED APPLICATIONS

The present application is a continuation of PCT patent application no. PCT/JP2021/002128, filed Jan. 22, 2021, which claims priority to Japanese patent application no. JP 2020-024003, filed Feb. 17, 2020, the entire contents of which are being incorporated by reference.

BACKGROUND

The present application relates to a secondary battery, an electronic device, and a power tool.

Lithium ion batteries have been developed for applications requiring high output such as power tools and automobiles. A battery suitable for high output often has a structure in which a current collector plate is joined to a current collecting foil exposed on an end surface of a cylindrical electrode winding body in order to flow a large current. In such a battery, the end surface of the electrode winding body is covered with the current collector plate. Therefore, when the battery abnormally generates heat, a generated gas tends to be less likely to be discharged to the outside of the electrode winding body.

For example, a secondary battery is described in which a groove, which is an annular thin portion, is formed in a bottom portion of a battery can.

SUMMARY

The present application relates to a secondary battery, an electronic device, and a power tool.

When the technique of the secondary battery noted above in the BACKGROUND section is applied to a cylindrical battery including a negative electrode current collector plate having a flat plate shape on an end surface of an electrode winding body, there is a problem that gas cannot be smoothly released at the time of an abnormal increase in internal pressure depending on a positional relationship between the groove and the negative electrode current collector plate.

Therefore, the present application relates to providing a battery for high rate discharge capable of smoothly releasing gas at the time of abnormal heat generation according to an embodiment.

In order to solve the above-described problems, the present application, in an embodiment, provides a secondary battery in which an electrode winding body having a structure in which a strip-shaped positive electrode and a strip-shaped negative electrode are stacked with a separator interposed therebetween and wound, a positive electrode current collector plate, and a negative electrode current collector plate are housed in a battery can, the positive electrode having a covered portion covered with a positive electrode active material covering portion and a positive electrode active material non-covered portion on a strip-shaped positive electrode foil, the negative electrode having a covered portion covered with a negative electrode active material covering portion and a negative electrode active material non-covered portion on a strip-shaped negative electrode foil, the positive electrode active material non-covered portion being joined to the positive electrode current collector plate at one end portion of the electrode winding body, the negative electrode active material non-covered portion being joined to the negative electrode current collector plate at the other end portion of the electrode winding body, the electrode winding body having a flat surface formed by bending any one or both of the positive electrode active material non-covered portion and the negative electrode active material non-covered portion toward a central axis of the wound structure and overlapping the positive electrode active material non-covered portion and the negative electrode active material non-covered portion, and a first groove formed in the flat surface, at least one C-shaped second groove being included in a can bottom of the battery can, when viewed from a direction of the central axis, a second groove being at a position not overlapping with a plate-shaped portion of the negative electrode current collector plate, and all end portions of the second groove being located at a position overlapping with the plate-shaped portion of the negative electrode current collector plate.

According to an embodiment of the present application, when pressure inside the battery is increased by gas generated at the time of abnormal heat generation, the can bottom is opened (cleaved) starting from the groove having relatively low strength, and the gas in the battery can be discharged to the outside of the battery. In the end portion of the electrode winding body, the portion not overlapping the plate-shaped portion of the negative electrode current collector plate and the end portion of the second groove are arranged so as not to overlap each other as viewed from a central axis direction of the electrode winding body, whereby the can bottom can be smoothly opened (cleaved) when the pressure inside the battery increases. The contents of the present application should not be interpreted as being limited by the effects exemplified herein.

DETAILED DESCRIPTION

Hereinafter, the present application will be described in further detail including with reference to the drawings according to an embodiment.

The present application will be described herein including in reference to preferred examples, without limitation, according to an embodiment.

In an embodiment, a cylindrical lithium ion battery will be described as an example of the secondary battery.

Figure 1:
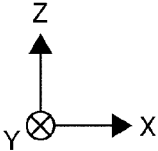
FIG. 1 is a sectional view of a battery according to an embodiment.

First, a whole configuration of the lithium ion battery will be described. FIG. 1 is a schematic sectional view of a lithium ion battery 1. For example, as illustrated in FIG. 1, the lithium ion battery 1 is a cylindrical lithium ion battery containing an electrode winding body 20 inside a battery can 11.

Specifically, the lithium ion battery 1 includes, for example, a pair of insulating plates 12 and 13 and the electrode winding body 20 inside the cylindrical battery can 11. However, the lithium ion battery 1 may further include, for example, one or two or more of a positive temperature coefficient (PTC) element, a reinforcing member, and the like inside the battery can 11.

The battery can 11 is a member that mainly houses the electrode winding body 20. The battery can 11 is, for example, a cylindrical vessel having one end surface opened and the other end surface closed. That is, the battery can 11 has an open end surface (open end surface 11N). The battery can 11 contains, for example, one or two or more of metal materials such as iron, aluminum and their alloys. However, one or two or more of metal materials such as nickel may be plated on the surface of the battery can 11, for example.

Figure 5:
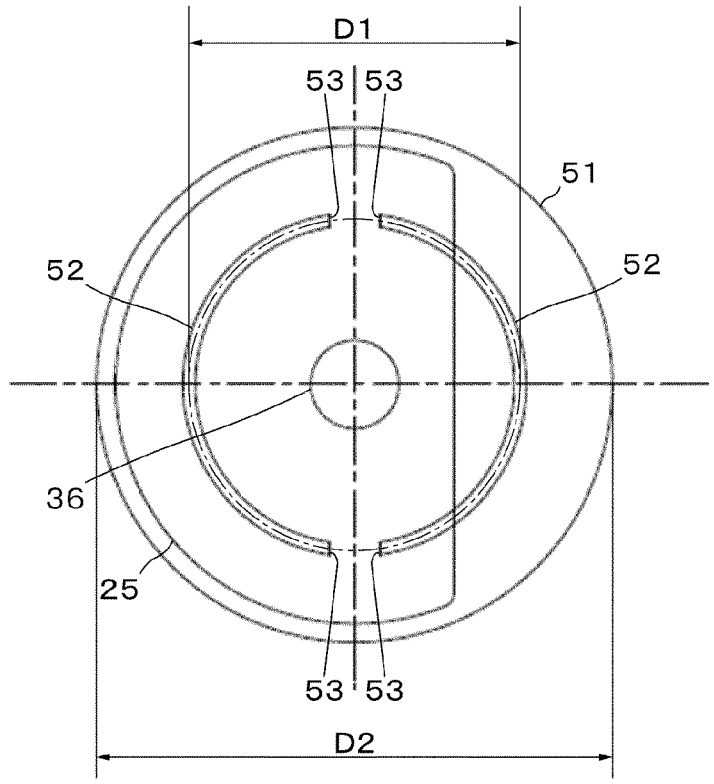
FIG. 5 is a view used for describing Example 1.

The closed end surface of the battery can 11 has a can bottom 51. The can bottom 51 serves as a negative electrode terminal of the battery 1. The can bottom 51 has a C-shaped groove 52 (second groove). The groove 52 is a thin portion disposed on a surface to be used as the inner side of the battery can 11 out of both surfaces of the can bottom 51 The groove 52 is a groove-shaped portion which is formed by, for example, an imprint process and in which a thickness of the can bottom 51 is reduced. The groove 52 has a C-shape. When a plurality of the grooves 52 are provided, for example, as shown in FIG. 5, it is preferable that the two grooves are provided on the same circumference. This circle passes through a center of a width of the groove 52, and the diameter of the circle is D1. Furthermore, the circle preferably has a concentric circle relationship with the outer edge (the diameter is D2) of the can bottom 51. This is because the concentric circle relationship makes liquid leakage from the groove 52 less likely to occur when the battery 1 falls. At this time, the width of the groove 52 is preferably 0.10 mm or more and 1.00 mm or less. This is because if the width of the groove 52 is less than 0.10 mm, the battery 1 may rupture when abnormal heat is applied to the battery 1, and if the width of the groove 52 exceeds 1.00 mm, the electrode winding body 20 may come out of the battery can 11 when the battery 1 falls.

The diameter (hereinafter, referred to as D1) of the C-shaped groove 52 is preferably 44% or more of an outer diameter of the can bottom 51. This will be described. When abnormal heat is applied to the battery 1 from the outside, heat (flame) is generated from an outer peripheral portion of the electrode winding body 20. The heat (flame) acts to soften the groove 52 of the can bottom 51, and the closer the groove 52 is to the outer peripheral portion of the electrode winding body 20, the more easily the groove is softened. When D1 is 44% or more of the outer diameter of the can bottom, since the groove 52 is close to the outer peripheral portion of the electrode winding body 20, when abnormal heat is applied to the battery from the outside, the groove 52 of the can bottom 51 is likely to be softened. Therefore, the groove 52 of the can bottom 51 is cleaved by an increase in gas pressure of the can bottom 51 due to generated gas, and the gas can be released to the outside. On the other hand, when D1 is less than 44% of the outer diameter of the can bottom 51, the groove 52 is distant from the outer peripheral portion of the electrode winding body 20, so that the groove 52 is hardly softened by heat generated during a combustion test. Therefore, when the gas pressure of the can bottom 51 is increased by the generated gas, there is a possibility that the can bottom 51 is not cleaved and the gas cannot be released to the outside.

The insulating plates 12 and 13 are dish-shaped plates having a surface substantially perpendicular to a winding axis (Z axis in FIG. 1) of the electrode winding body 20. Furthermore, the insulating plates 12 and 13 are arranged to sandwich the electrode winding body 20 between them, for example.

At the open end surface 11N of the battery can 11, the battery lid 14 and the safety valve mechanism 30 are crimped with the gasket 15 interposed therebetween, and a crimped structure 11R (crimped structure) is formed. Consequently, the battery can 11 is hermetically sealed in a state in which the electrode winding body 20 and the like are housed inside the battery can 11.

The battery lid 14 is a member that mainly closes the open end surface 11N of the battery can 11 in the state in which the electrode winding body 20 and the like are housed inside the battery can 11. The battery lid 14 contains, for example, a material similar to a material for forming the battery can 11. A central region of the battery lid 14 protrudes, for example, in a +Z direction. Thus, a region (peripheral region) other than the central region of the battery lid 14 is in contact with, for example, the safety valve mechanism 30.

The gasket 15 is a member that mainly seals a gap between the bent portion 11P and the battery lid 14 by being interposed between the battery can 11 (bent portion 11P) and the battery lid 14. However, a surface of the gasket 15 may be coated with asphalt or the like, for example.

The gasket 15 contains, for example, one or two or more of insulating materials. The type of insulating material is not particularly limited, and is, for example, a polymeric material such as polybutylene terephthalate (PBT) and polypropylene (PP). Particularly, the insulating material is preferably polybutylene terephthalate. This is because the gap between the bent portion 11P and the battery lid 14 is sufficiently sealed while the battery can 11 and the battery lid 14 are electrically separated from each other.

When pressure (internal pressure) inside the battery can 11 rises, the safety valve mechanism 30 mainly releases the internal pressure by releasing the hermetically sealed state of the battery can 11 as necessary. The cause of the increase in the internal pressure of the battery can 11 is, for example, a gas generated due to a decomposition reaction of an electrolytic solution during charge and discharge.

In the cylindrical lithium ion battery, a strip-shaped positive electrode 21 and a strip-shaped negative electrode 22 are spirally wound with the separator 23 interposed therebetween, and are accommodated in the battery can 11 in a state of being impregnated with the electrolytic solution. The positive electrode 21 is obtained by forming an active material covered portion 21B of the positive electrode on one surface or both surfaces of a positive electrode foil 21A, and a material of the positive electrode foil 21A is, for example, a metal foil made of aluminum or an aluminum alloy. The negative electrode 22 is obtained by forming a negative electrode active material layer 22B on one surface or both surfaces of a negative electrode foil 22A, and a material of the negative electrode foil 22A is, for example, a metal foil made of nickel, a nickel alloy, copper, or a copper alloy. The separator 23 is a porous and insulating film, and enables movement of substances such as ions and an electrolytic solution while electrically insulating the positive electrode 21 and the negative electrode 22.

Although the positive electrode active material layer 21B and the negative electrode active material layer 22B cover many portions of the positive electrode foil 21A and the negative electrode foil 22A, respectively, neither of the active material layers intentionally covers a periphery of one end in a direction of the strip. Hereinafter, the portions not covered with the active material layers 21B and 22B will be appropriately referred to as active material non-covered portions, and the portions covered with the active material layers 21B and 22B will be appropriately referred to as active material covered portions. In the cylindrical battery, the electrode winding body 20 is wound in such a manner that an active material non-covered portion 21C of the positive electrode and an active material non-covered portion 22C of the negative electrode are overlapped each other with the separator 23 interposed therebetween so as to face in opposite directions.

Figure 2:
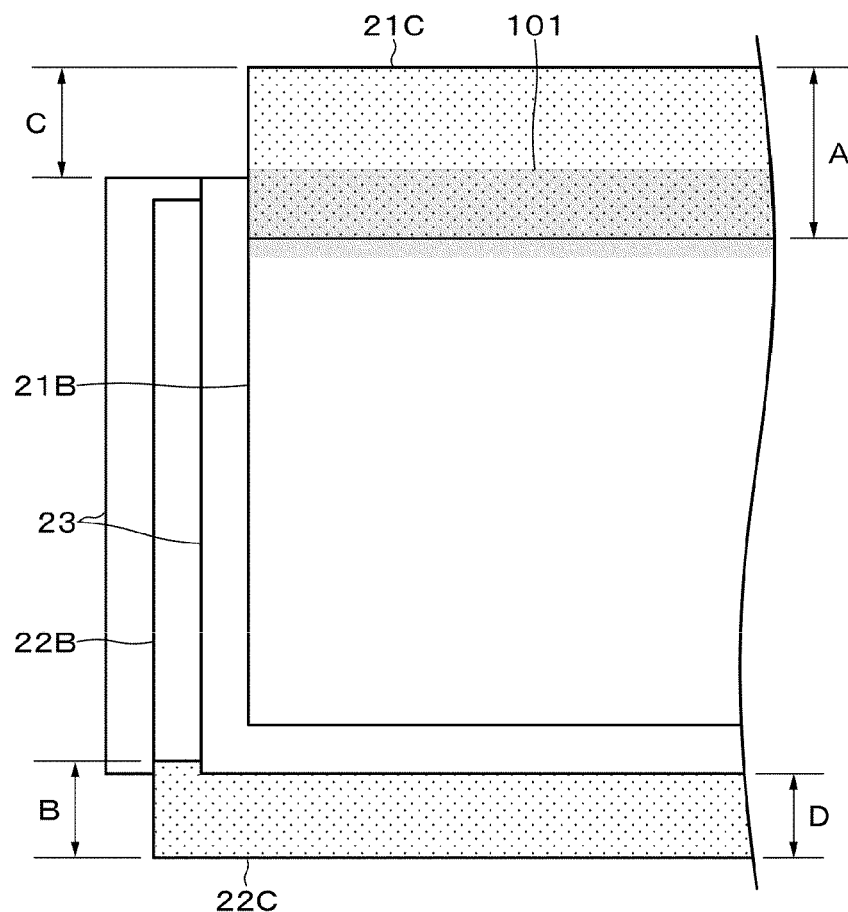
FIG. 2 is a view for explaining an example of an arrangement relationship between a positive electrode, a negative electrode, and a separator in an electrode winding body.

FIG. 2 shows an example of a structure before winding in which the positive electrode 21, the negative electrode 22, and the separator 23 are stacked. A width of the active material non-covered portion 21C (upper dot portion in FIG. 2) of the positive electrode is A, and a width of the active material non-covered portion 22C (lower dot portion in FIG. 2) of the negative electrode is B. In one embodiment, A>B is preferable, for example, A=7 (mm) and B=4 (mm). A length of a portion where the active material non-covered portion 21C of the positive electrode protrudes from one end of the separator 23 in the width direction is C, and a length of a portion where the active material non-covered portion 22C of the negative electrode protrudes from the other end of the separator 23 in the width direction is D. In one embodiment, C>D is preferable, for example, C=4.5 (mm) and D=3 (mm).

The active material non-covered portion 21C of the positive electrode is formed from, for example, aluminum and the like, and the active material non-covered portion 22C of the negative electrode is formed from, for example, copper and the like; therefore, in general, the active material non-covered portion 21C of the positive electrode is softer (has a lower Young's modulus) than the active material non-covered portion 22C of the negative electrode. Thus, in one embodiment, A>B and C>D are more preferable, and in this case, when the active material non-covered portion 21C of the positive electrode and the active material non-covered portion 22C of the negative electrode are simultaneously bent at the same pressure from both electrode sides, a height of the bent portion measured from a tip of the separator 23 may be substantially the same between the positive electrode 21 and the negative electrode 22. At this time, since the active material non-covered portions 21C and 22C are bent and suitably overlap each other, the active material non-covered portions 21C and 22C and current collector plates 24 and 25 can be easily joined by laser welding. Although joining in one embodiment means joining by laser welding, the joining method is not limited to laser welding.

In the positive electrode 21, a section having a width of 3 mm and including a boundary between the active material non-covered portion 21C and the active material covered portion 21B is covered with an insulating layer 101 (gray region portion in FIG. 2). The entire region of the active material non-covered portion 21C of the positive electrode facing the active material covered portion 22B of the negative electrode with the separator interposed therebetween is covered with the insulating layer 101. The insulating layer 101 has an effect of reliably preventing an internal short circuit of the battery 1 when a foreign matter enters between the active material covered portion 22B of the negative electrode and the active material non-covered portion 21C of the positive electrode. In addition, the insulating layer 101 has an effect of absorbing an impact when the impact is applied to the battery 1 and reliably preventing the active material non-covered portion 21C of the positive electrode from being bent or being short-circuited to the negative electrode 22.

A through hole 26 is formed in a central axis of the electrode winding body 20. The through hole 26 is a hole into which a winding core for assembling the electrode winding body 20 and an electrode rod for welding are inserted. Since the electrode winding body 20 is wound in an overlapping manner such that the active material non-covered portion 21C of the positive electrode and the active material non-covered portion 22C of the negative electrode face in opposite directions, the active material non-covered portion 21C of the positive electrode gathers on one end surface (end surface 41) of the electrode winding body, and the active material non-covered portion 22C of the negative electrode gathers on the other end surface (end surface 42) of the electrode winding body 20. In order to improve contact with the current collector plates 24 and 25 for extracting current, the active material non-covered portions 21C and 22C are bent, and the end surfaces 41 and 42 are flat surfaces. The bending direction is a direction from outer edge portions 27 and 28 of the end surfaces 41 and 42 toward the through hole 26, and the active material non-covered portions of adjacent peripheries overlap each other and are bent in a wound state. In the present specification, the "flat surface" includes not only an absolutely flat surface but also a surface having some unevenness and surface roughness to the extent that the active material non-covered portion and the current collector plate can be joined.

When the active material non-covered portions 21C and 22C are bent so as to overlap each other, at first it appears that the end surfaces 41 and 42 can be made flat; however, if no processing is performed before bending, wrinkles or voids (spaces) are generated in the end surfaces 41 and 42 at the time of bending, and the end surfaces 41 and 42 do not become flat surfaces. Here, "wrinkles" and "voids" are portions where unevenness occurs in the bent active material non-covered portions 21C and 22C, and the end surfaces 41 and 42 do not become flat surfaces. In order to prevent the occurrence of wrinkles and voids, a groove 43 (first groove, see, for example, FIG. 4B) is formed in advance in a radial direction from the through hole 26. The groove 43 extends from the outer edge portions 27 and 28 of the end surfaces 41 and 42 to the through hole 26. The through hole 26 is provided at the center of the electrode winding body 20, and the through hole 26 is used as a hole into which a welding tool is inserted in an assembly process of the lithium ion battery 1. The active material non-covered portions 21C and 22C at the start of winding of the positive electrode 21 and the negative electrode 22 near the through hole 26 have cut-outs. This is to prevent the through hole 26 from being closed at the time of bending toward the through hole 26. The groove 43 remains in the flat surface after the active material non-covered portions 21C and 22C are bent, and a portion without the groove 43 is joined (welded or the like) to the positive electrode current collector plate 24 or the negative electrode current collector plate 25. Not only the flat surface but also the groove 43 may be joined to a part of the current collector plates 24 and 25.

A detailed configuration of the electrode winding body 20, that is, detailed configurations of the positive electrode 21, the negative electrode 22, the separator 23, and the electrolytic solution will be described later.

In a normal lithium ion battery, for example, a lead for current extraction is welded to each one portion of the positive electrode and the negative electrode; however, this is not suitable for high rate discharge because the internal resistance of the battery is large, and the lithium ion battery generates heat and becomes high temperature during discharge. Thus, in the lithium ion battery of one embodiment, the positive electrode current collector plate 24 and the negative electrode current collector plate 25 are arranged on the end surfaces 41 and 42, and are welded to the active material non-covered portions 21C and 22C of the positive electrode and the negative electrode present on the end surfaces 41 and 42 at multiple points, thereby suppressing the internal resistance of the battery to be low. The end surfaces 41 and 42 being bent to be flat surfaces also contributes to the reduction in resistance.

Figure 3:
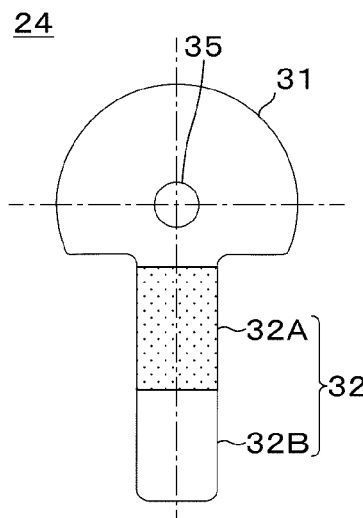
FIG. 3 includes view A and B, where A is a plan view of a positive electrode current collector plate, and where B is a plan view of a negative electrode current collector plate.
Figure 3:
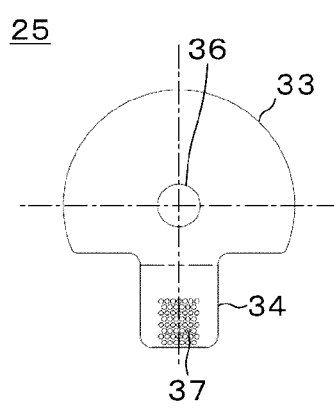

FIGS. 3A and 3B show an example of the current collector plate. FIG. 3A shows the positive electrode current collector plate 24, and FIG. 3B shows the negative electrode current collector plate 25. The material of the positive electrode current collector plate 24 is, for example, a metal plate made of a simple substance or a composite of aluminum or an aluminum alloy, and the material of the negative electrode current collector plate 25 is, for example, a metal plate made of a simple substance or a composite of nickel, a nickel alloy, copper, or a copper alloy. As shown in FIG. 3A, the positive electrode current collector plate 24 has a shape in which a rectangular strip-shaped portion 32 is attached to a plate-shaped portion 31 having a flat fan shape. A hole 35 is formed near the center of the plate-shaped portion 31, and the position of the hole 35 is a position corresponding to the through hole 26.

A portion indicated by shaded lines in FIG. 3A is an insulating portion 32A in which an insulating tape is attached to the strip-shaped portion 32 or an insulating material is applied, and a portion below the dot portion in the drawing is a connecting portion 32B to a sealing plate also serving as an external terminal. In the case of a battery structure in which a metal center pin (not shown) is not provided in the through hole 26, there is a low possibility that the strip-shaped portion 32 comes into contact with a portion having a negative electrode potential, and therefore, the insulating portion 32A may not be provided. In this case, a width between the positive electrode 21 and the negative electrode 22 can be increased by an amount corresponding to a thickness of the insulating portion 32A to increase a charge/discharge capacity.

The negative electrode current collector plate 25 has substantially the same shape as the positive electrode current collector plate 24, but has a different strip-shaped portion. The strip-shaped portion 34 of the negative electrode current collector plate in FIG. 3B is shorter than the strip-shaped portion 32 of the positive electrode current collector plate, and has no portion corresponding to the insulating portion 32A. The strip-shaped portion 34 includes a circular protrusion (projection) 37 indicated by a plurality of circles. During resistance welding, current is concentrated on the protrusion, and the protrusion is melted to weld the strip-shaped portion 34 to a bottom of the battery can 11. Similarly to the positive electrode current collector plate 24, in the negative electrode current collector plate 25, a hole 36 is formed near the center of a plate-shaped portion 33, and the position of the hole 36 is a position corresponding to the through hole 26. The plate-shaped portion 31 of the positive electrode current collector plate 24 and the plate-shaped portion 33 of the negative electrode current collector plate 25 have a fan shape, and thus cover a part of the end surfaces 41 and 42. The reason for not covering the whole is to allow the electrolytic solution to smoothly permeate the electrode winding body when the battery is assembled, or to easily release gas generated when the battery is in an abnormally high temperature state or an overcharged state to the outside of the battery.

The positive electrode active material layer 21B contains at least a positive electrode material (positive electrode active material) capable of occluding and releasing lithium, and may further contain a positive electrode binder, a positive electrode conductive agent, and the like. The positive electrode material is preferably a lithium-containing composite oxide or a lithium-containing phosphate compound. The lithium-containing composite oxide has, for example, a layered rock salt-type or spinel-type crystal structure. The lithium-containing phosphate compound has, for example, an olivine type crystal structure.

The positive electrode binder contains synthetic rubber or a polymer compound. The synthetic rubber includes styrene-butadiene-based rubber, fluororubber, ethylene propylene diene, and the like. The polymer compounds includes polyvinylidene fluoride (PVdF), polyimide, and the like.

The positive electrode conductive agent is a carbon material such as graphite, carbon black, acetylene black, or Ketjen black. However, the positive electrode conductive agent may be a metal material and a conductive polymer.

A surface of the negative electrode foil 22A is preferably roughened for improving close-contact characteristics with the negative electrode active material layer 22B. The negative electrode active material layer 22B contains at least a negative electrode material (negative electrode active material) capable of occluding and releasing lithium, and may further contain a negative electrode binder, a negative electrode conductive agent, and the like.

The negative electrode material contains, for example, a carbon material. The carbon material is easily graphitizable carbon, non-graphitizable carbon, graphite, low crystalline carbon, or amorphous carbon. The shape of the carbon material is fibrous, spherical, granular, or scaly.

The negative electrode material contains, for example, a metal-based material. Examples of the metal-based material include Li (lithium), Si (silicon), Sn (tin), Al (aluminum), Zr (zinc), and Ti (titanium). The metal-based element forms a compound, a mixture, or an alloy with another element, and examples thereof include silicon oxide ($SiO_x$ ($0<x\leq2$)), silicon carbide (SiC), an alloy of carbon and silicon, and lithium titanate (LTO).

The separator 23 is a porous film containing a resin, and may be a stacked film of two or more kinds of porous films. Examples of the resin include polypropylene and polyethylene. The separator 23 may include a resin layer on one side or both sides of a porous membrane as a substrate layer. The reason for this is that, this allows for an improvement in close-contact characteristics of the separator 23 with respect to each of the positive electrode 21 and the negative electrode 22, thereby suppressing distortion of the electrode winding body 20.

The resin layer contains a resin such as PVdF. When the resin layer is formed, the base material layer is coated with a solution prepared by dissolving the resin in an organic solvent, and thereafter, the substrate layer is dried. Alternatively, the base material layer may be immersed in the solution, and thereafter the substrate layer may be dried. The resin layer preferably contains inorganic particles or organic particles from the viewpoint of improving heat resistance and safety of the battery. The type of the inorganic particles is aluminum oxide, aluminum nitride, aluminum hydroxide, magnesium hydroxide, boehmite, talc, silica, mica, or the like. In place of the resin layer, a surface layer formed by a sputtering method, an ALD (atomic layer deposition) method, and other methods and mainly composed of inorganic particles may be used.

The electrolytic solution contains a solvent and an electrolyte salt, and may further contain an additive and the like as necessary. The solvent is a non-aqueous solvent such as an organic solvent, or water. An electrolytic solution containing a non-aqueous solvent is referred to as a non-aqueous electrolytic solution. The non-aqueous solvent is a cyclic carbonate ester, a chain carbonate ester, lactone, a chain carboxylic ester, or nitrile (mononitrile).

Although a representative example of the electrolyte salt is a lithium salt, a salt other than the lithium salt may be contained. Examples of the lithium salt include lithium hexafluorophosphate ($LiPF_6$), lithium tetrafluoroborate ($LiBF_4$), lithium perchlorate ($LiClO_4$), lithium methanesulfonate ($LiCH_3SO_3$), lithium trifluoromethanesulfonate ($LiCF_3SO_3$), and dilithium hexafluorosilicate ($Li_2SF_6$). These salts may be used in mixture, and among them, it is preferable to use $LiPF_6$ and $LiBF_4$ in mixture from the viewpoint of improving battery characteristics. The content of the electrolyte salt is not particularly limited, and is preferably from 0.3 mol/kg to 3 mol/kg with respect to the solvent.

A method for producing the lithium ion battery 1 of one embodiment will be described with reference to FIGS. 4A to 4F. First, the positive electrode active material was applied and attached to a surface of the strip-shaped positive electrode foil 21A to form a covered portion of the positive electrode 21, and the negative electrode active material was applied to a surface of the strip-shaped negative electrode foil 22A to form a covered portion of the negative electrode 22. At this time, the active material non-covered portions 21C and 22C not applied and attached with the positive electrode active material and the negative electrode active material were produced at one end in a transverse direction of the positive electrode 21 and one end in a transverse direction of the negative electrode 22. A cut-out was formed in a part of the active material non-covered portions 21C and 22C, the part corresponding to the winding start at the time of winding. Steps such as drying were performed on the positive electrode 21 and the negative electrode 22. The active material non-covered portion 21C of the positive electrode and the active material non-covered portion 22C of the negative electrode were overlapped with the separator 23 interposed therebetween so as to be in opposite directions, and wound in a spiral shape so as to form the through hole 26 in the central axis and to dispose the formed cut-out near the central axis, thereby producing the electrode winding body 20 as shown in FIG. 4A.

Figure 4:
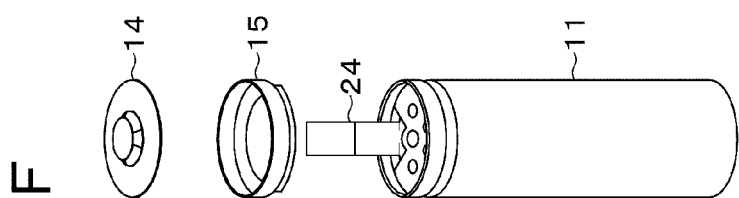
FIG. 4 includes views A to F for explaining an assembly process of the battery according to one embodiment.
Figure 4:
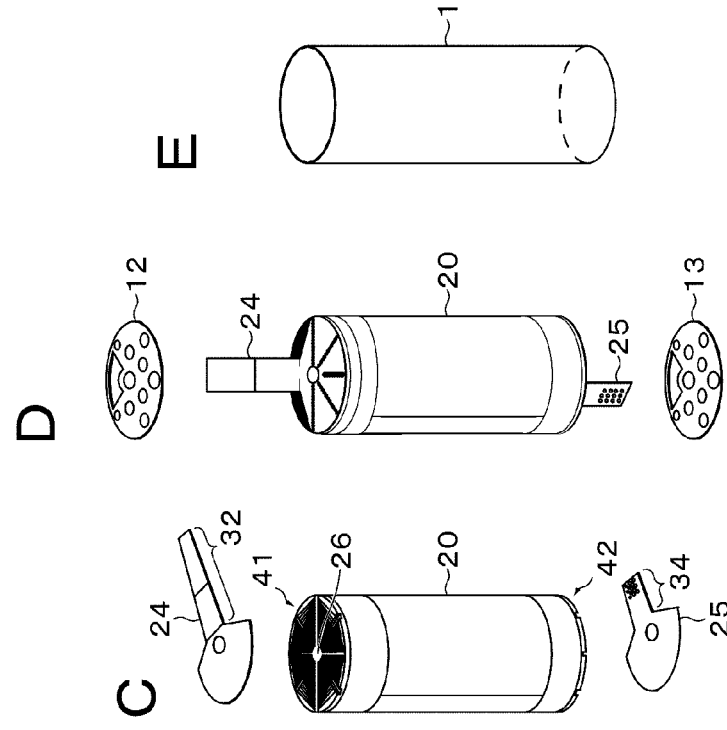
Figure 4:
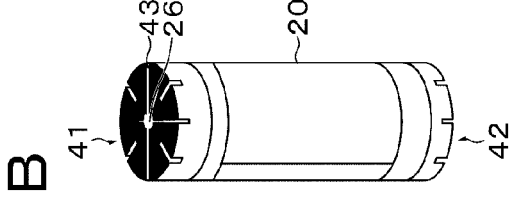
Figure 4:
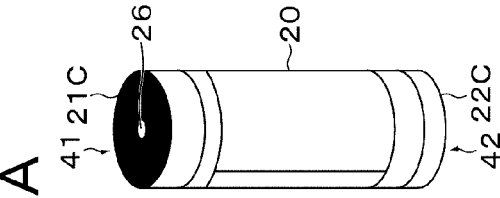

Next, as shown in FIG. 4B, by perpendicularly pressing an end of a thin flat plate (for example, a thickness of 0.5 mm) or the like against the end surfaces 41 and 42, the end surfaces 41 and 42 were locally bent to produce the groove 43. In this way, the groove 43 extending radially from the through hole 26 toward the central axis was produced. The number and arrangement of the grooves 43 shown in FIG. 4B are merely examples. As shown in FIG. 4C, the same pressure was simultaneously applied from both electrode sides in a direction substantially perpendicular to the end surfaces 41 and 42, and the active material non-covered portion 21C of the positive electrode and the active material non-covered portion 22C of the negative electrode were bent to form the end surfaces 41 and 42 to be flat surfaces. At this time, a load was applied with a flat plate surface or the like such that the active material non-covered portions on the end surfaces 41 and 42 were bent by overlapping toward the through hole 26 side. Thereafter, the plate-shaped portion 31 of the positive electrode current collector plate 24 was laser-welded to the end surface 41, and the plate-shaped portion 33 of the negative electrode current collector plate 25 was laser-welded to the end surface 42.

Thereafter, as shown in FIG. 4D, the strip-shaped portions 32 and 34 of the current collector plates 24 and 25 were bent, the insulating plates 12 and 13 (or insulating tapes) were attached to the positive electrode current collector plate 24 and the negative electrode current collector plate 25, and the electrode winding body 20 assembled as described above was inserted into the battery can 11 shown in FIG. 4E to weld the bottom of the battery can 11. After the electrolytic solution was injected into the battery can 11, sealing was performed with the gasket 15 and the battery lid 14 as shown in FIG. 4F.

EXAMPLES

Hereinafter, the present application will be described based on Examples in which the number of occurrences of defects in a burner test is compared using the lithium ion battery 1 produced as described above according to an embodiment. The present application is not limited to Examples described below.

In all of the following Examples and Comparative Examples, a battery size was 21700 (diameter: 21 mm, length: 70 mm). The width of the active material covered portion 21B of the positive electrode was 59 mm, the width of the active material covered portion 22B of the negative electrode was 62 mm, and the width of the separator 23 was 64 mm. The separator 23 was overlapped so as to cover the entire range of the active material covered portion 21B of the positive electrode and the active material covered portion 22B of the negative electrode, the width of the active material non-covered portion of the positive electrode was 7 mm, and the width of the active material non-covered portion of the negative electrode was 4 mm. The number of the grooves 43 was eight, and the grooves were arranged at substantially equal angular intervals.

The number of the grooves 52 of the can bottom 51 and the number of end portions 53 of the groove not overlapping the plate-shaped portion 33 of the negative electrode current collector plate will be described with reference to FIG. 5 as an example. FIG. 5 is a schematic view in which the outer edge of the can bottom 51 of the battery can 11, the groove 52, and the plate-shaped portion 33 of the negative electrode current collector plate 25 are drawn in an overlapping manner when viewed from a direction (Z-axis direction in FIG. 1) of the central axis of the electrode winding body. In Examples and Comparative Examples, the shape of the groove 52 is a C-shape or an O-shape. The number of the grooves 52 is the number of C-shaped or O-shaped grooves. In the example of FIG. 5, the number of the grooves 52 is two.

The end portion 53 of the groove 52 refers to a tip portion of the C-shaped groove. Thus, the number of the end portions 53 is counted as two for one C-shaped groove. In FIG. 5, the plate-shaped portion 33 and the hole 36 of the plate-shaped portion are shown as the negative electrode current collector plate 25, and the negative electrode current collector plate 25 has no cut-out or hole other than the hole 36 of the plate-shaped portion. The number of end portions of the groove not overlapping the plate-shaped portion of the negative electrode current collector plate is the number of the end portions 53 of the groove 52 of the can bottom 51 present at positions not overlapping the plate-shaped portion 33 when viewed from a central axis direction (Z-axis direction in FIG. 1) of the electrode winding body 20. In the example of FIG. 5, since all the end portions 53 of the groove 52 overlap the plate-shaped portion 33, the number of the end portions 53 of the groove 52 not overlapping the plate-shaped portion 33 is zero.

Example 1

As shown in FIG. 5, the number of grooves of the can bottom was two, and the number of end portions of the groove not overlapping the plate-shaped portion of the negative electrode current collector plate was zero.

Example 2

Figure 6:
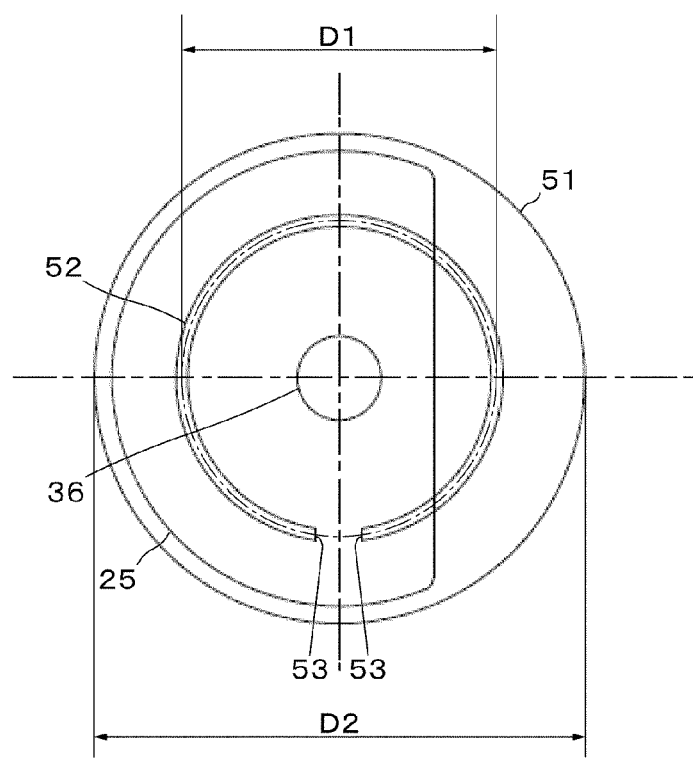
FIG. 6 is a view used for describing Example 2.

As shown in FIG. 6, the number of grooves of the can bottom was one, and the number of end portions of the groove not overlapping the plate-shaped portion of the negative electrode current collector plate was zero.

Comparative Example 1

Figure 7:
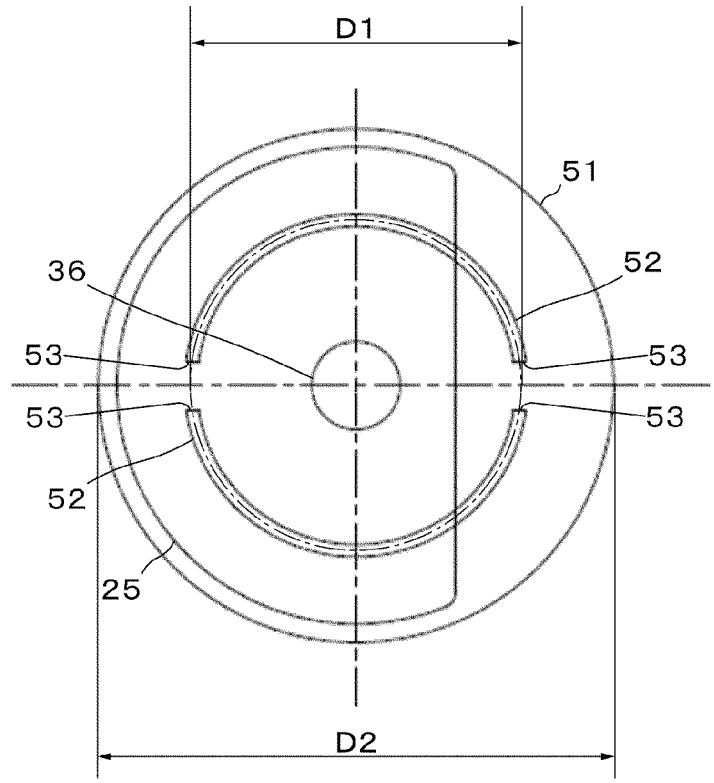
FIG. 7 is a view used for describing Comparative Example 1.

As shown in FIG. 7, the number of grooves of the can bottom was two, and the number of end portions of the groove not overlapping the plate-shaped portion of the negative electrode current collector plate was two.

Comparative Example 2

Figure 8:
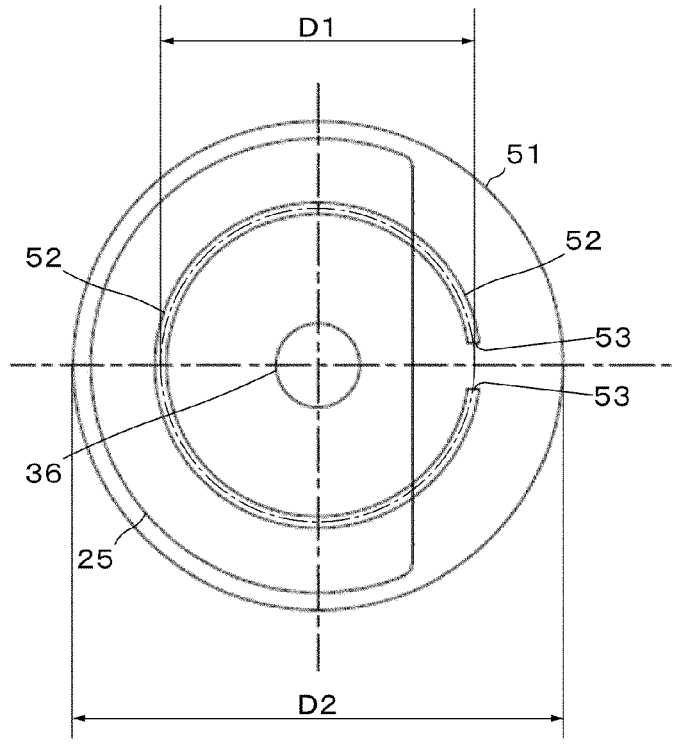
FIG. 8 is a view used for describing Comparative Example 2.

As shown in FIG. 8, the number of grooves of the can bottom was one, and the number of end portions of the groove not overlapping the plate-shaped portion of the negative electrode current collector plate was two.

Comparative Example 3

Figure 9:
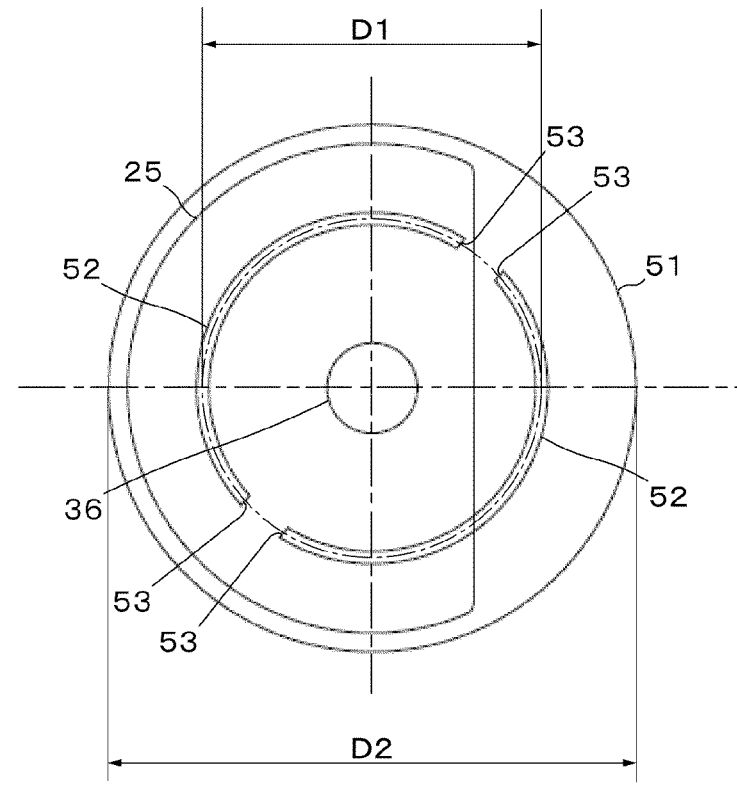
FIG. 9 is a view used for describing Comparative Example 3.

As shown in FIG. 9, the number of grooves of the can bottom was two, and the number of end portions of the groove not overlapping the plate-shaped portion of the negative electrode current collector plate was one.

Comparative Example 4

Figure 10:
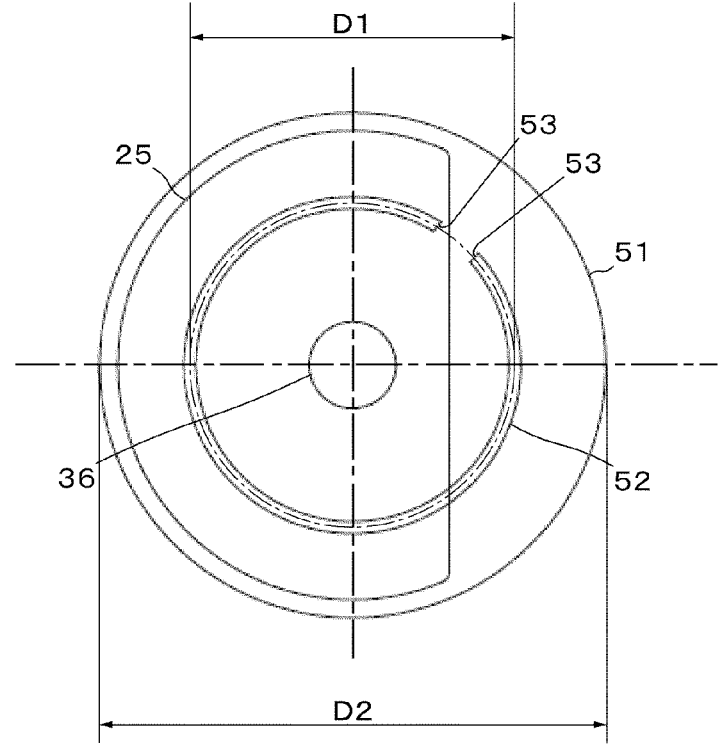
FIG. 10 is a view used for describing Comparative Example 4.

As shown in FIG. 10, the number of grooves of the can bottom was one, and the number of end portions of the groove not overlapping the plate-shaped portion of the negative electrode current collector plate was one.

Comparative Example 5

Figure 11:
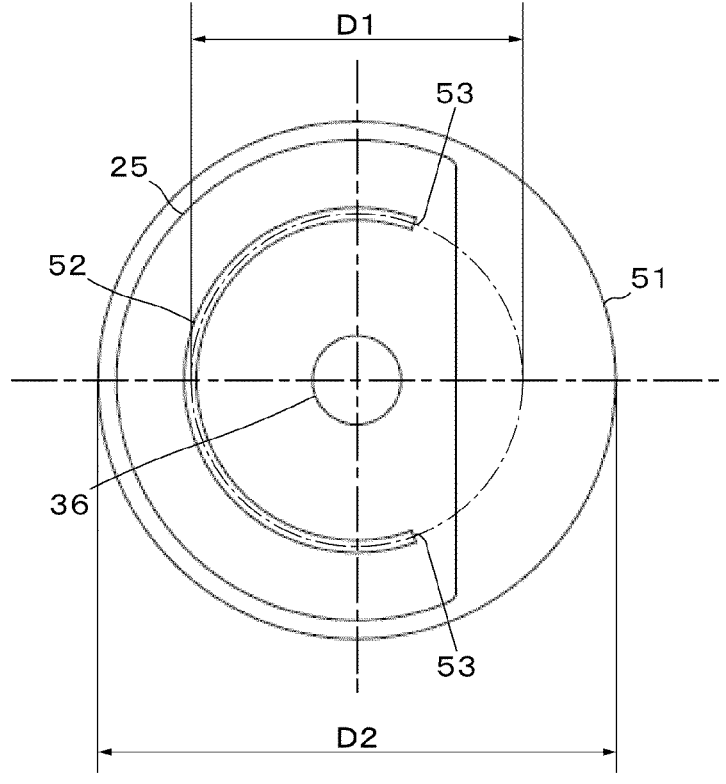
FIG. 11 is a view used for describing Comparative Example 5.

As shown in FIG. 11, the number of grooves of the can bottom was one, and the number of end portions of the groove not overlapping the plate-shaped portion of the negative electrode current collector plate was zero.

Comparative Example 6

Figure 12:
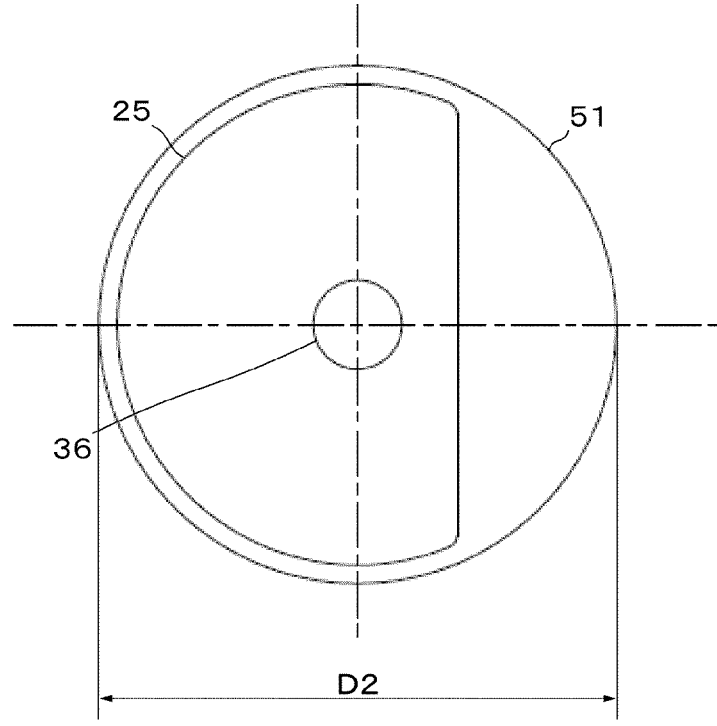
FIG. 12 is a view used for describing Comparative Example 6.

As shown in FIG. 12, the number of grooves of the can bottom was zero, and the number of end portions of the groove not overlapping the plate-shaped portion of the negative electrode current collector plate was zero.

Comparative Example 7

Figure 13:
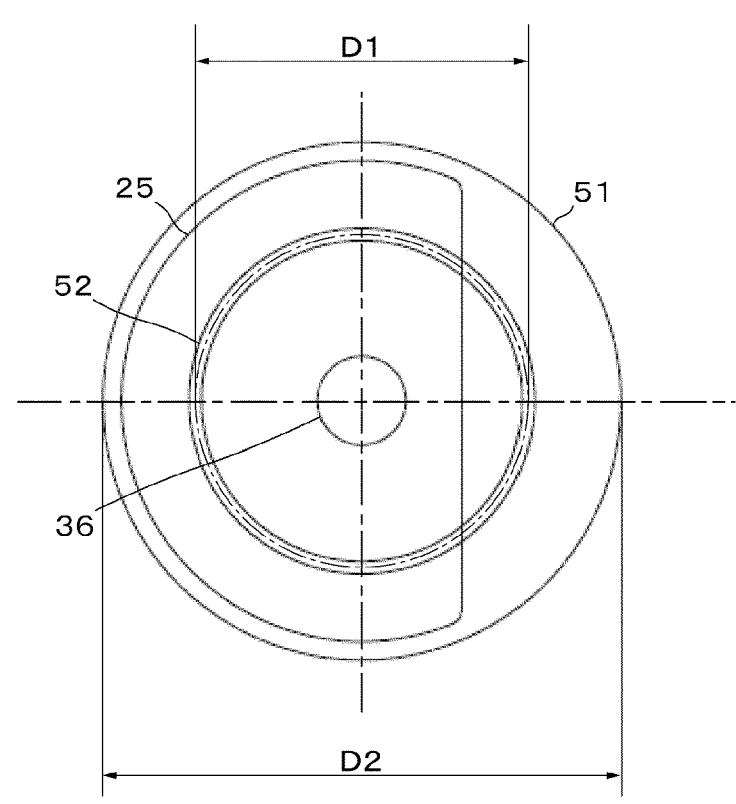
FIG. 13 is a view used for describing Comparative Example 7.

As shown in FIG. 13, the number of grooves of the can bottom was one, and the number of end portions of the groove not overlapping the plate-shaped portion of the negative electrode current collector plate was zero.

The battery 1 of the above example was assembled and charged, and a burner test was performed. The burner test is based on UL 1642 projectile test. Before the burner test, the battery was charged under the conditions of CC/CV charge, 4.2 V/2 A, and 100 mAcut until the battery was fully charged. In the burner test, combustion was performed using a gas burner in an octagonal aluminum net ($\Phi$0.25 mm, 16-18 wires/inch) having a distance between the diagonal planes of 61 cm and a height of 30.5 cm. A screen (20 opening/inch, $\Phi$0.43 mm iron wire) of a platform with a hole of 102 mm in the central portion was installed 38 mm above a mouth of the burner. A gas flow rate of the burner was set to 500 ml/min (methane) and 150 to 175 ml/min (propane), the battery was placed on the screen (the battery was not fixed unless moved to the end) in a state in which the screen was made red with a bright blue burner flame, and combustion was performed. In the burner test, 100 samples were tested, the battery 1 or a portion of the battery 1 penetrating an enclosure (metal cage) was determined to be defective, and the number of determined defects was counted, and regarded as the number of defects in the burner test. The results are shown below.

TABLE 1

| | The number of grooves | The number of end portions of groove not overlapping plate-shaped portion of negative electrode current collector plate | The number of defectives in burner test |
|---|---|---|---|
| Example 1 | 2 | 0 | 2 |
| Example 2 | 1 | 0 | 5 |
| Comparative Example 1 | 2 | 2 | 12 |
| Comparative Example 2 | 1 | 2 | 15 |
| Comparative Example 3 | 2 | 1 | 10 |
| Comparative Example 4 | 1 | 1 | 10 |
| Comparative Example 5 | 1 | 0 | 20 |

TABLE 1-continued

| | The number of grooves | The number of end portions of groove not overlapping plate-shaped portion of negative electrode current collector plate | The number of defectives in burner test |
|---|---|---|---|
| Comparative Example 6 | 0 | 0 | 25 |
| Comparative Example 7 | 1 | 0 | 19 |

In Examples 1 and 2, the number of defectives in the burner test was 5 or less, which was relatively small, whereas in Comparative Examples 1 to 7, the number of defects was 10 or more. During the burner test, the battery 1 is heated, and the pressure inside the battery 1 is increased by the gas generated from the inside of the electrode winding body 20 of the battery 1. It is considered that the can bottom is opened (cleaved) starting from the groove 52 having relatively low strength, and the gas is discharged to the outside of the battery. In Examples 1 and 2, a region where the end surface of the electrode winding body 20 is not closed, that is, a region where the plate-shaped portion 33 of the negative electrode current collector plate 25 is not present is a main passage for gas. Since the groove 52 is present in this region and the groove 52 does not have the end portion 53, it is considered that the can bottom 51 is smoothly opened (cleaved) and the gas can be safely discharged.

In Comparative Examples 1 to 4, when viewed from the central axis direction of the electrode winding body 20, the end portion 53 of the groove 52 is disposed so as to overlap a region where the plate-shaped portion 33 of the negative electrode current collector plate 25 is absent. Thus, it is considered that the can bottom 51 is not smoothly opened (cleaved) because the end portion 53 of the groove 52 exists in the region where the plate-shaped portion 33 of the negative electrode current collector plate 25 does not exist. That is, it is considered that since the end portion 53 of the groove 52 exists in the region that is the main passage for gas, the gas is hardly discharged. In Comparative Examples 5 and 6, since there was no groove 52 of the can bottom 51 in the region not overlapping the plate-shaped portion 33 of the negative electrode current collector plate 25, that is, in the region that is the main passage for gas, it is considered that the gas is hardly discharged. In Comparative Example 7, since the shape of the groove 52 is not a C shape but an O shape, the contents of the battery 1 pops out and penetrates the enclosure (metal cage), so that the number of defects is considered to be relatively large.

From these results and considerations, at least one C-shaped groove 52 is provided in the can bottom 51 of the battery can 11, when viewed from the direction of the central axis of the electrode winding body 20, in a case where the groove 52 is provided at a position not overlapping the plate-shaped portion 33 of the negative electrode current collector plate 25, and all the end portions 53 of the groove are at positions overlapping the plate-shaped portion 33 of the negative electrode current collector plate 25, it can be determined that when the internal pressure of the battery 1 increases, the can bottom is smoothly opened (cleaved), and the gas can be safely discharged out of the battery.

The present application has been described herein; however, the contents of the present application are not limited thereto, and various modifications can be made.

In Examples and Comparative Examples, the number of the grooves 43 was set to 8, but other numbers may be used. The battery size is 21700, but may be 18650 or any other size.

The positive electrode current collector plate 24 and the negative electrode current collector plate 25 include the plate-shaped portions 31 and 33 having a fan shape, but may have other shapes.

The present application can also be applied to other batteries other than the lithium ion battery and batteries having a shape other than a cylindrical shape (for example, a laminate-type battery, a square-type battery, a coin-type battery, and a button-type battery) according to an embodiment. In this case, the shape of the "end surface of the electrode winding body" may be not only a cylindrical shape but also an elliptical shape, a flat shape, or the like.

Figure 14:
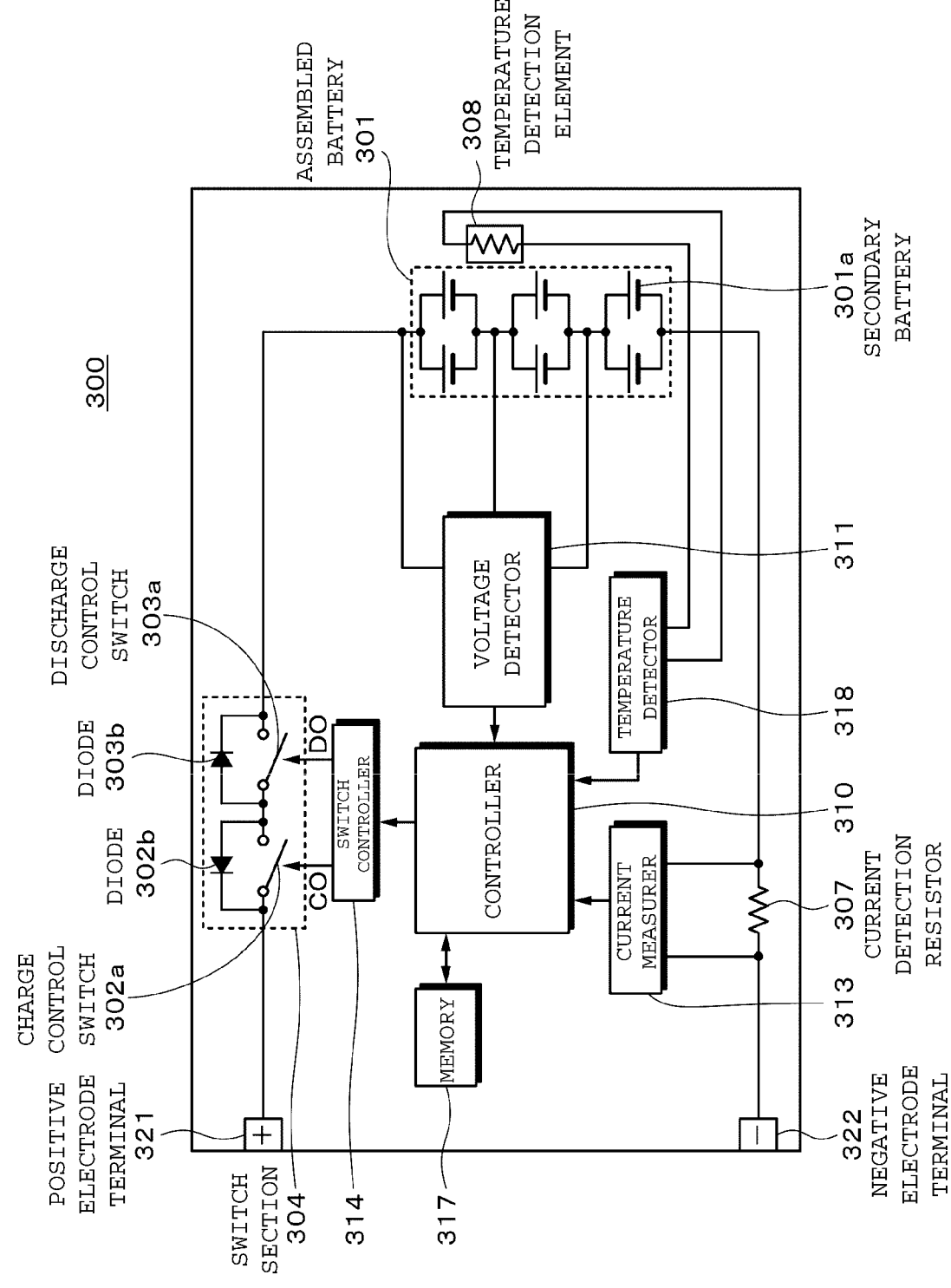
FIG. 14 is a connection diagram used for describing a battery pack as an application example of the present application.

FIG. 14 is a block diagram showing a circuit configuration example in a case where the secondary battery according to embodiment is applied to a battery pack 300. The battery pack 300 includes an assembled battery 301, a switch section 304 including a charge control switch 302a and a discharge control switch 303a, a current detection resistor 307, a temperature detection element 308, and a controller 310. The controller 310 can control each device, further perform charge and discharge control at the time of abnormal heat generation, and calculate and correct a remaining capacity of the battery pack 300. A positive electrode terminal 321 and a negative electrode terminal 322 of the battery pack 300 are connected to a charger or an electronic device, and are charged and discharged.

The assembled battery 301 is formed by connecting a plurality of secondary batteries 301a to each other in series and/or in parallel. FIG. 14 shows, as an example, a case where the six secondary batteries 301a are connected to each other in 2 parallel 3 series (2P3S).

The temperature detector 318 is connected to a temperature detection element 308 (for example, a thermistor), measures the temperature of the assembled battery 301 or the battery pack 300, and supplies the measured temperature to the controller 310. A voltage detector 311 measures the voltage of the assembled battery 301 and the respective secondary batteries 301a configuring the assembled battery and performs A/D conversion of this measured voltage to supply the resulting voltage to the controller 310. A current measurer 313 measures the current by using the current detection resistor 307 and supplies this measured current to the controller 310.

A switch controller 314 controls the charge control switch 302a and the discharge control switch 303a of the switch section 304 based on the voltage and the current input from the voltage detector 311 and the current measurer 313. The switch controller 314 prevents overcharge and overdischarge by sending an OFF control signal to the switch section 304 when the voltage of the secondary battery 301a has become equal to or higher than an overcharge detection voltage (for example, 4.20 V±0.05 V) or equal to or lower than an overdischarge detection voltage (2.4 V±0.1 V).

After the charge control switch 302a or the discharge control switch 303a is turned off, charging or discharging can be performed only through a diode 302b or a diode 303b. As these charge/discharge switches, a semiconductor switch such as a MOSFET can be used. In FIG. 14, the switch section 304 is provided on a plus (+) side, but may be provided on a minus (−) side.

The memory 317 includes a RAM and a ROM, and stores and rewrites a value of the battery characteristics calculated by the controller 310, a full charge capacity, the remaining capacity, and the like.

The secondary battery according to embodiment is mounted on a device such as an electronic device, an electric transportation device, or a power storage device, and can be used for supplying electric power.

Examples of the electronic device include notebook personal computers, smartphones, tablet terminals, PDAs (personal digital assistants), mobile phones, wearable terminals, digital still cameras, electronic books, music players, game machines, hearing aids, power tools, televisions, lighting devices, toys, medical devices, and robots. In addition, electric transportation devices, power storage devices, power tools, and electric unmanned aerial vehicles to be described later can also be included in the electronic device in a broad sense.

Examples of the electric transportation device include electric vehicles (including hybrid vehicles), electric motorcycles, electric assisted bicycles, electric buses, electric carts, automatic guided vehicles (AGV), and railway vehicles. In addition, electric passenger aircrafts and electric unmanned aircrafts for transportation are also included. The secondary battery according to an embodiment is used not only as these driving power supplies but also as an auxiliary power supply, a power supply for recovering a regenerated energy, and other power supplies.

Examples of the power storage device include power storage modules for commercial use or household use, and power supplies for electric power storage use for a building such as a house, a building, or an office, or for a power-generating facility.

Figure 15:
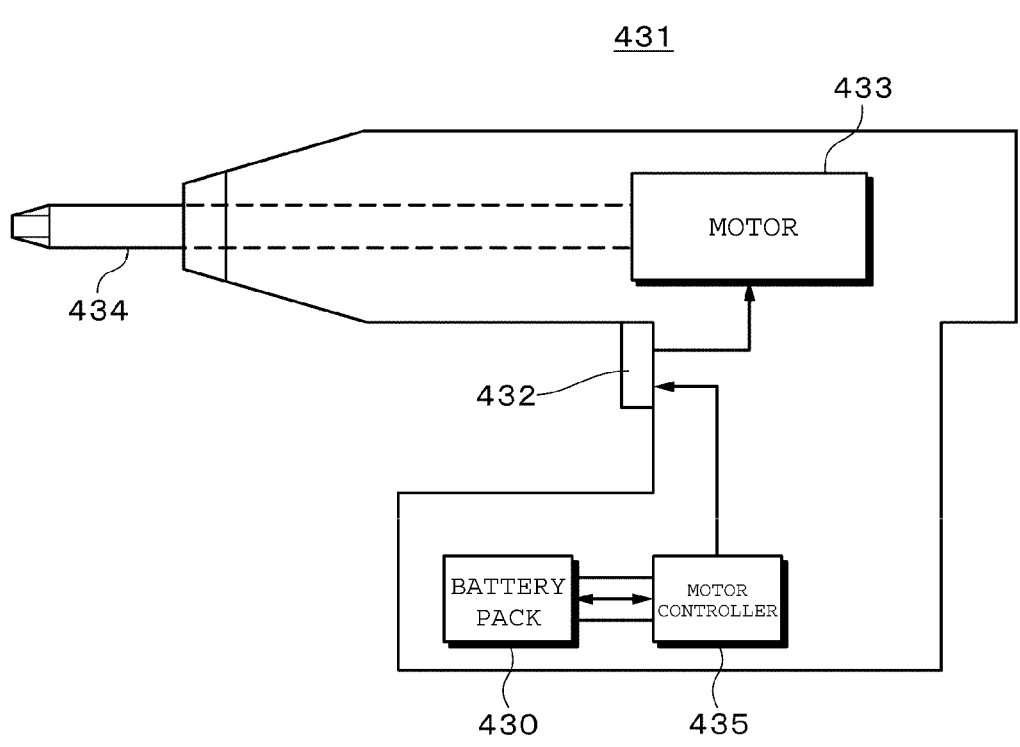
FIG. 15 is a connection diagram used for describing a power tool as an application example of the present application.

An example of an electric driver as a power tool to which the present application can be applied will be schematically described with reference to FIG. 15. An electric driver 431 is provided with a motor 433 that transmits rotational power to a shaft 434 and a trigger switch 432 operated by a user. A battery pack 430 and a motor controller 435 according to an embodiment are housed in a lower housing of a handle of the electric driver 431. The battery pack 430 is built in the electric driver 431 or is detachable.

Each of the battery pack 430 and the motor controller 435 may be provided with a microcomputer (not shown) so that charge/discharge information of the battery pack 430 can be communicated with each other. The motor controller 435 can control operation of the motor 433 and cut off power supply to the motor 433 at the time of abnormality such as overdischarge.

Figure 16:
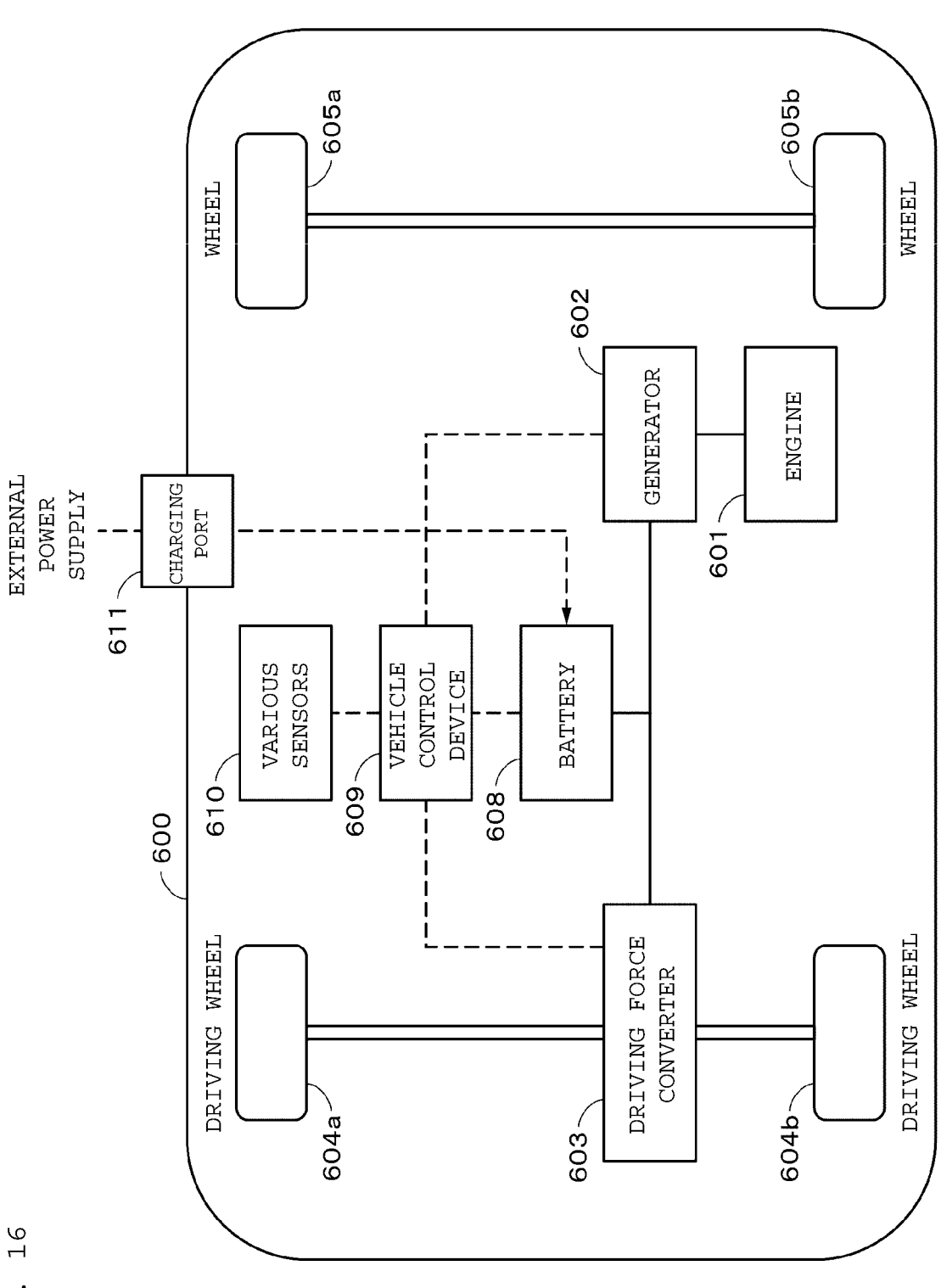
FIG. 16 is a connection diagram used for describing an electric vehicle as an application example of the present

As an example in which the present application is applied to an electric vehicle power storage system, FIG. 16 schematically shows a configuration example of a hybrid vehicle (HV) employing a series hybrid system. The series hybrid system is a car travelling with an electric power driving force converter using electric power generated by a generator powered by an engine or electric power obtained by temporarily storing the generated electric power in a battery.

An engine 601, a generator 602, an electric power driving force converter 603 (DC motor or AC motor, hereinafter, it is simply referred to as the "motor 603"), a driving wheel 604a, a driving wheel 604b, a wheel 605a, a wheel 605b, a battery 608, a vehicle control device 609, various sensors 610, and a charging port 611 are mounted in a hybrid vehicle 600 as described above. As the battery 608, the battery pack 300 or a power storage module on which a plurality of the batteries 1 are mounted can be applied according to an embodiment.

The motor 603 is operated by the electric power of the battery 608, and a rotating force of the motor 603 is transmitted to the driving wheels 604a and 604b. The electric power generated by the generator 602 can be stored in the battery 608 by the rotating force generated by the engine 601. The various sensors 610 control an engine speed through the vehicle control device 609, or control an opening degree of a throttle valve (not shown).

When the hybrid vehicle 600 is decelerated by a brake mechanism (not shown), a resistance force during the deceleration is added as a rotating force to the motor 603, and regenerative electric power generated due to this rotating force is stored in the battery 608. The battery 608 can be charged by being connected to an external power supply via the charging port 611 of the hybrid vehicle 600. Such an HV vehicle is referred to as a plug-in hybrid vehicle (PHV or PHEV).

The secondary battery according to the present application can also be applied to a downsized primary battery and used as a power supply of a tire pressure monitoring system (TPMS) built in wheels 604 and 605.

Although a series hybrid vehicle has been described above as an example, the present application is also applicable to a parallel system using an engine and a motor together or a hybrid vehicle in which a series system and a parallel system are combined. In addition, the present application is also applicable to an electric vehicle (EV or BEV) and a fuel cell vehicle (FCV) that travel only by a drive motor not using an engine.

DESCRIPTION OF REFERENCE SYMBOLS

1: Lithium ion battery
12: Insulating plate
21: Positive electrode
21A: Positive electrode foil
21B: Positive electrode active material covering portion
21C: Active material non-covered portion of positive electrode
22: Negative electrode
22A: Negative electrode foil
22B: Negative electrode active material covering portion
22C: Active material non-covered portion of negative electrode
23: Separator
24: Positive electrode current collector plate
25: Negative electrode current collector plate
26: Through hole
27, 28: Outer edge portion
41, 42: End surface
43: Groove It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
   an electrode winding body having a structure in which a strip-shaped positive electrode and a strip-shaped negative electrode are stacked with a separator interposed therebetween and wound, a positive electrode collector plate, and a negative electrode collector plate are housed in a battery can, the positive electrode having a covered portion covered with a positive electrode active material covering portion and a positive electrode active material non-covered portion on a strip-shaped positive electrode foil, the negative electrode having a covered portion covered with a negative electrode active material covering portion and a negative electrode active material non-covered portion on a strip-shaped negative electrode foil, the positive electrode active material non-covered portion being joined to the positive electrode current collector plate at one end portion of the electrode winding body, the negative electrode active material non-covered portion being joined to the negative electrode current collector plate at the other end portion of the electrode winding body, the electrode winding body having a flat surface configured by any one or both of the positive electrode active material non-covered portion and the negative electrode active material non-covered portion bent toward a central axis of the wound structure and overlapping the positive electrode active material non-covered portion and the negative electrode active material non-covered portion, and a first groove formed in the flat surface, at least one C-shaped second groove being included in a can bottom of the battery can, wherein the at least one C-shaped second groove having a curved shape in a plan view in a direction orthogonal to the can bottom of the battery can, when viewed from a direction of the central axis, the at least one C-shaped second groove being at a position not overlapping with a plate-shaped portion of the negative electrode current collector plate, and all end portions of the at least one C-shaped second groove being located at a position overlapping the plate-shaped portion of the negative electrode current collector plate.

2. The secondary battery according to claim 1, wherein a width of the second groove is 0.10 mm or more and 1.00 mm or less.

3. The secondary battery according to claim 1, wherein the second groove is disposed on an inner surface of the battery can.

4. The secondary battery according to claim 1, wherein a material of the negative electrode current collector plate includes a simple substance including nickel, a nickel alloy, copper, a copper alloy, or a composite material.

5. The secondary battery according to claim 1, further comprising a safety valve that releases a gas when the gas is generated in the battery can.

6. An electronic device comprising the secondary battery according to claim 1.

7. A power tool comprising the secondary battery according to claim 1.

* * * * *